US009537897B2

(12) United States Patent
Joo (10) Patent No.: US 9,537,897 B2
(45) Date of Patent: Jan. 3, 2017

(54) METHOD AND APPARATUS FOR PROVIDING ANALYSIS SERVICE BASED ON BEHAVIOR IN MOBILE NETWORK ENVIRONMENT

(71) Applicant: WINS Co., Ltd., Gyeonggi-do (KR)

(72) Inventor: Eun Young Joo, Seoul (KR)

(73) Assignee: WINS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/793,686

(22) Filed: Jul. 7, 2015

(65) Prior Publication Data

US 2016/0006766 A1 Jan. 7, 2016

(30) Foreign Application Priority Data

Jul. 7, 2014 (KR) ........................ 10-2014-0084464

(51) Int. Cl.
*G06F 11/00* (2006.01)
*H04L 29/06* (2006.01)
*G06F 21/53* (2013.01)
*G06F 21/56* (2013.01)

(52) U.S. Cl.
CPC .............. *H04L 63/20* (2013.01); *G06F 21/53* (2013.01); *G06F 21/566* (2013.01); *H04L 63/0254* (2013.01); *H04L 63/145* (2013.01); *H04L 63/1425* (2013.01); *H04L 63/1433* (2013.01); *H04L 63/1441* (2013.01)

(58) Field of Classification Search
CPC ................................ H04L 63/20; H04L 63/18
USPC ...................................................... 726/22–25
See application file for complete search history.

(56) References Cited

U.S. PATENT DOCUMENTS

2005/0198388 A1* 9/2005 Teodosiu .............. G06F 9/4416 709/245
2007/0258438 A1* 11/2007 Bennett ............... H04L 63/0227 370/352

(Continued)

OTHER PUBLICATIONS

Axer et al., "Formal timing analysis of automatic repeat request for switched real-time networks," Proceedings of the 9th IEEE International Symposium on Industrial Embedded Systems (SIES 2014) Year: 2014 pp. 78-87.*

(Continued)

*Primary Examiner* — Roderick Tolentino
(74) *Attorney, Agent, or Firm* — The PL Law Group, PLLC (57) ABSTRACT

An apparatus and method for providing analysis service based on behavior in a mobile network environment are disclosed. The apparatus includes a control unit configured to control the path of a packet based on predetermined policy information, to block the packet based on a result of an analysis of the packet, or to extract information about the packet and selectively process the extracted information based on the predetermined policy information; a download path and file management engine configured to collect downloaded files corresponding to the URL of the packet, to extract the downloaded files as an app file, and to transfer the extracted app file to a virtual machine; and a virtual machine management engine unit configured to determine whether malware is present in the app file and whether the app file has accessed the resources, and to selectively manage the corresponding app based on a result of the determination.

5 Claims, 7 Drawing Sheets

(56) References Cited

U.S. PATENT DOCUMENTS

| | | | | |
|---|---|---|---|---|
| 2008/0010683 | A1* | 1/2008 | Baddour | G06F 17/30864 |
| | | | | 726/24 |
| 2008/0016339 | A1* | 1/2008 | Shukla | G06F 21/53 |
| | | | | 713/164 |
| 2010/0138382 | A1* | 6/2010 | Nagoya | G06F 21/10 |
| | | | | 707/609 |
| 2012/0246729 | A1* | 9/2012 | Kim | G06F 21/78 |
| | | | | 726/24 |
| 2013/0097355 | A1* | 4/2013 | Dang | G06F 21/55 |
| | | | | 711/6 |
| 2014/0007229 | A1* | 1/2014 | Smith | G06F 21/564 |
| | | | | 726/22 |
| 2014/0368332 | A1* | 12/2014 | Hong | H04L 51/38 |
| | | | | 340/501 |
| 2015/0020203 | A1* | 1/2015 | Xie | G06F 21/56 |
| | | | | 726/24 |

OTHER PUBLICATIONS

Wei et al., "Bottleneck analysis for data acquisition in high-speed network traffic monitoring," China Communications Year: 2014, vol. 11, Issue: 1 pp. 110-118.*

* cited by examiner

METHOD AND APPARATUS FOR PROVIDING ANALYSIS SERVICE BASED ON BEHAVIOR IN MOBILE NETWORK ENVIRONMENT

CROSS-REFERENCE TO RELATED APPLICATION AND CLAIM OF PRIORITY

This application claims the benefit of Korean Patent Application No. 10-2014-0084464, filed on Jul. 7, 2014, at the Korean Intellectual Property Office, the entire disclosure of which is incorporated herein by reference.

BACKGROUND

1. Technical Field

The present invention relates to service for detecting and managing a malicious behavior through the analysis of a vulnerable point in a mobile app in a high-speed network security service.

2. Description of the Related Art

In general, a vulnerable point in an app is handled by a method of blocking the vulnerable point based on a pattern using a mobile terminal vaccine program after the app has been installed in a mobile environment.

In this case, the treatment of infection is highly dependent on the detection ability of a vaccine because malware is isolated and treated after the malware has occurred first and then infection has occurred.

Figure 1:
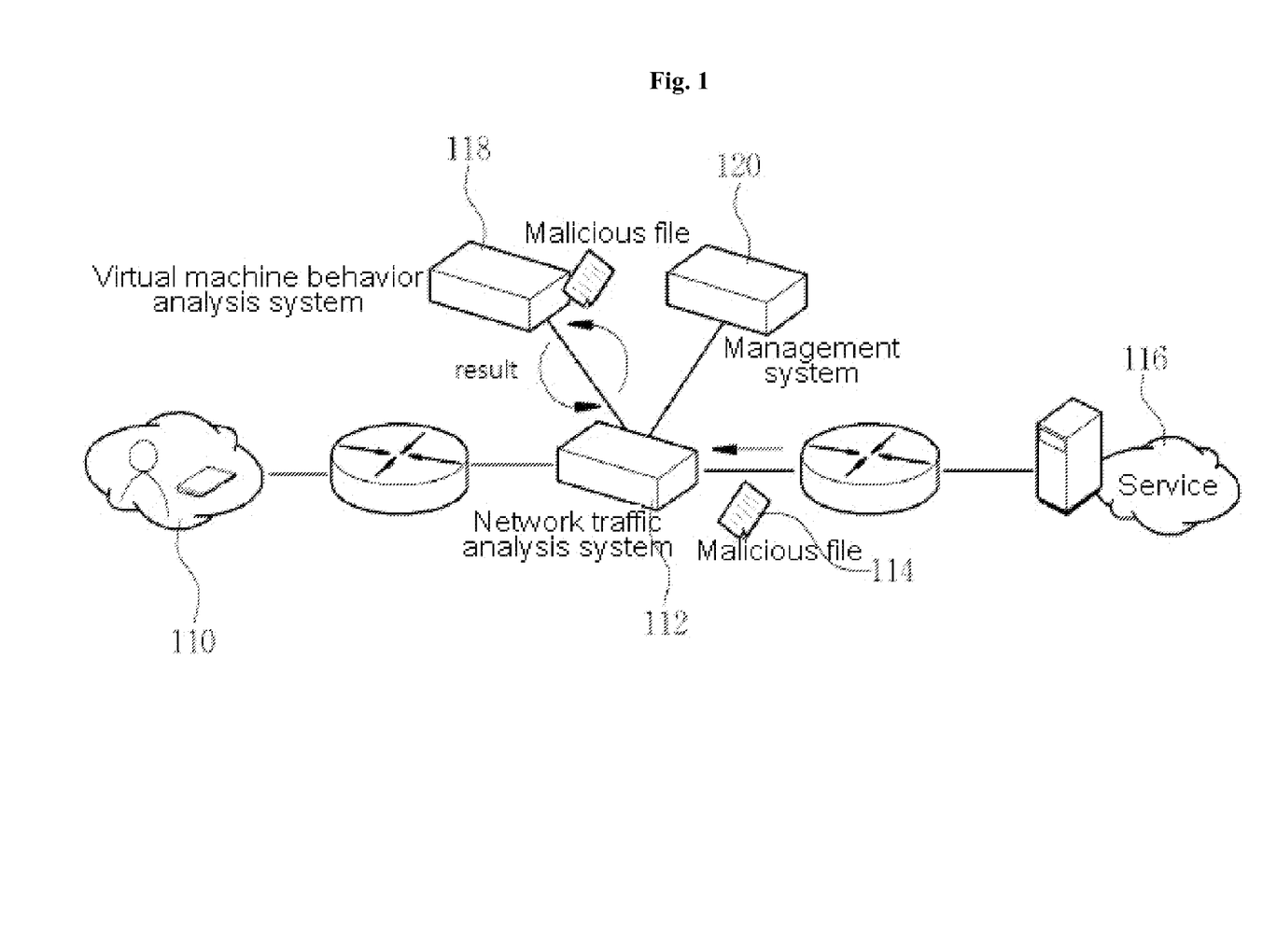
FIG. 1 is the schematic configuration of a system regarding the analysis of a malicious file in conventional network security.

FIG. 1 is the schematic configuration of a system regarding the analysis of a malicious file in conventional network security.

As illustrated in FIG. 1, if a malicious app file is downloaded from a service 116 when a user 110 downloads a mobile app from the service 116, analysis and cooperative tasks are performed via a network traffic analysis system 112 and a virtual machine behavior analysis system 118 in order to analyze such a malicious app. The results of the analysis are transferred to the network traffic analysis system 112 and then managed.

In this case, problems arise in that the time it takes to perform analysis is long and also it is not easy to immediately take measures because the virtual machine behavior analysis system 118 and the network traffic analysis system 112 separately collect and analyze the results of static analysis and dynamic analysis.

SUMMARY

At least one embodiment of the present invention is directed to the provision of a technology capable of rapidly analyzing a vulnerable point in an app and managing and handling the vulnerable point in real time through faster analysis when the app is downloaded in a network security stage.

Furthermore, at least one embodiment of the present invention is directed to the provision of a technology capable of maintaining an internal integrity environment for internal users within a system by analyzing and blocking a vulnerable app in real time in a mobile network environment, rapidly analyzing a harmful app and blocking the harmful app in real time by managing systems, managed and analyzed by a plurality of respective servers, as a single system, and simultaneously analyzing a plurality of vulnerable files by utilizing a manycore card.

In accordance with an aspect of the present invention, there is provided a method of providing analysis service based on behavior in a mobile network environment, the method including controlling a path of a packet based on predetermined policy information in order to detect malware in the packet loaded from a network interface card (NIC) and then decoded; blocking the packet based on a result of an analysis of the packet for each engine placed in the path, or extracting information about the packet and selectively processing the extracted information for each engine placed in the path based on the predetermined policy information; collecting, by a specific engine, downloaded files corresponding to a URL of the packet, extracting the downloaded files as an app file, and transferring the extracted app file to a virtual machine to which virtualized computing resources based on a manycore processor environment have been allocated; and determining whether malware is present in the app file and whether the app file has accessed the resources by analyzing the data and behavior of the app file for each OS version of the virtual machine, and selectively managing the corresponding app based on a result of the determination.

In accordance with another aspect of the present invention, there is provided an apparatus for providing analysis service based on behavior in a mobile network environment, the apparatus including a control unit configured to control a path of a packet based on predetermined policy information in order to detect malware in the packet loaded from a network interface card (NIC) and then decoded, and to block the packet based on a result of an analysis of the packet for each engine placed in the path, or to extract information about the packet and selectively process the extracted information for each engine in the path based on the predetermined policy information; a download path and file management engine configured to collect downloaded files corresponding to the URL of the packet via the control unit, to extract the downloaded files as an app file, and to transfer the extracted app file to a virtual machine to which virtualized computing resources based on a manycore processor environment have been allocated; and a virtual machine management engine unit configured to determine whether malware is present in the app file and whether the app file has accessed the resources by analyzing the data and behavior of the app file for each OS version of the virtual machine under a control of the control unit, and to selectively manage the corresponding app based on a result of the determination.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments of the present invention are described in detail with reference to the accompanying drawings below. Although specific details, such as specific components, are illustrated in the following description, they are provided merely to help a general understanding of the present invention. It will be apparent to those skilled in the art that various modifications and variations can be made within the scope of the present invention.

At least one embodiment of the present invention relates to the detection and management of malicious behavior by analyzing a vulnerable point in a mobile app in a high-speed network security service. More specifically, the present invention provides a technology capable of analyzing a packet using a packet analysis engine placed in each packet path, analyzing the data and behavior of an app file for each OS version of a virtual machine via the virtual machine if a malicious file is extracted, and parsing and managing the analysis signature of the corresponding packet and items including the download path, file, file name, and hash value of the malicious file based on the results of the analysis, thereby maintaining an internal integrity environment for internal users within a system by analyzing and blocking a vulnerable app in real time in a mobile network environment, rapidly analyzing a harmful app and blocking the harmful app in real time by managing systems, managed and analyzed by a plurality of respective servers, as a single system, and simultaneously analyzing a plurality of vulnerable files by utilizing a manycore card.

A method of providing analysis service based on behavior in a mobile network environment according to an embodiment of the present invention is described in detail below with reference to FIGS. 2 to 6.

Figure 2:
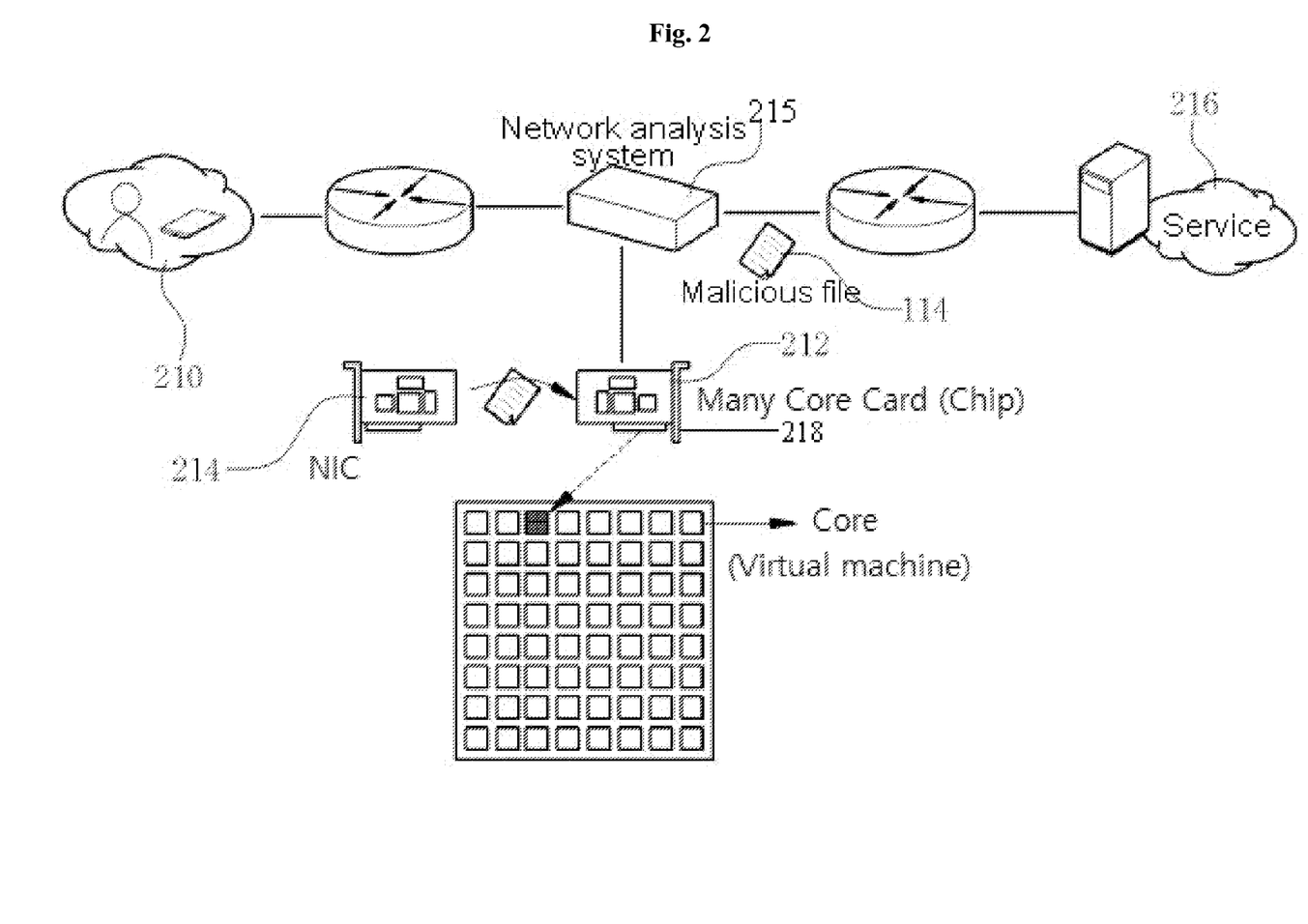
FIG. 2 is a diagram illustrating the schematic configuration of a system to which a method of providing analysis service based on behavior in a mobile network environment according to an embodiment of the present invention has been applied.

FIG. 2 is a diagram illustrating the schematic configuration of a system to which the method of providing analysis service based on behavior in a mobile network environment according to an embodiment of the present invention has been applied.

As illustrated in FIG. 2, in the system for providing analysis service based on behavior in a mobile network environment according to the present embodiment, when a malicious file is extracted from the network interface card (NIC) 214 of a network analysis system 215, the malicious file is sent to a virtual machine engine 212 including a manycore card (or chip) 218.

In this case, OSs corresponding to respective mobile versions are configured in the manycore card 218 in virtual machine form. After a virtual mobile environment has been constructed via the manycore card 218, whether the operation of behavior is normal with respect to a harmful app and the management of the harmful app are performed through the drain of data and the extraction of an environment using simulations in a virtual environment.

That is, with regard to a vulnerable point in a corresponding app downloaded from a service 216, the tasks of installing the app in an OS for each mobile version and analyzing behavior analysis are performed.

In accordance with at least one embodiment of the present invention, abnormal behavior occurring in a mobile network environment can be rapidly analyzed and detected in advance via the manycore card because each virtual mobile OS collects the results of behavior as a result of such behavior analysis task and transfers a result regarding a statistically vulnerable OS version to a network analysis engine.

This process is described in greater detail with reference to FIG. 3.

Figure 3:
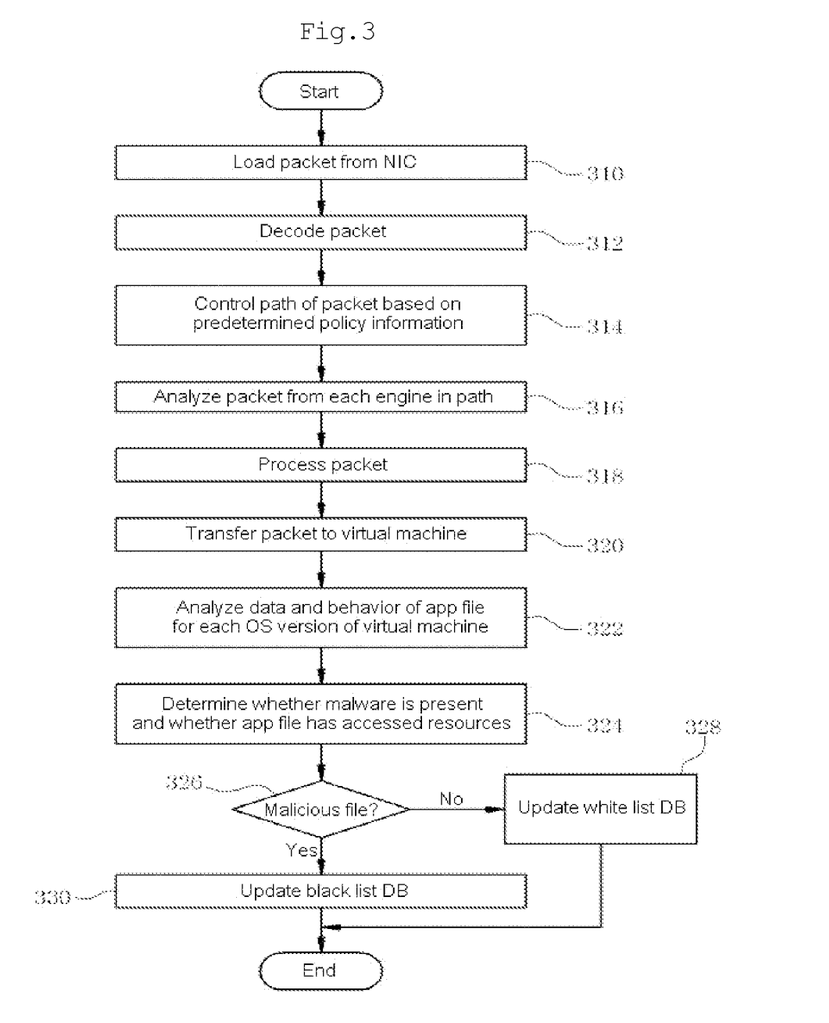
FIG. 3 is an overall flowchart illustrating the method of providing analysis service based on behavior in a mobile network environment according to an embodiment of the present invention.

FIG. 3 is an overall flowchart illustrating the method of providing analysis service based on behavior in a mobile network environment according to the present embodiment.

Referring to FIG. 3, in operation 310, a packet is loaded onto the NIC, and is then read. In operation 312, the packet read from the NIC is decoded.

In operation 314, in order to detect malware, the path of the packet based on predetermined policy information is controlled. In operation 316, the packet is analyzed for each engine placed in the path.

In this case, the predetermined policy information is used to perform overall control for the execution of analysis service based on behavior in a mobile network environment according to an embodiment of the present invention based on a network security service-related protocol that is related to illegal access and a malicious behavior in a communication network. Accordingly, packets that are loaded from the NIC and decoded in response to the control signal of the predetermined policy information are sequentially transferred and analyzed based on policy information for each engine placed in a path along which the packets to be processed should be forwarded.

In the process 316, the packet is blocked based on a result of the analysis of the packet from each engine placed in the path. Alternatively, information about the packet is extracted, and then the extracted information is selectively processed for each engine placed in the path based on the predetermined policy information.

More specifically, the first path of the decoded packet is controlled via a white list engine. Whether the packet corresponds to a normal file is determined based on an existing normal file list by searching for the download path and file of the packet. If, as a result of the determination, it is determined that the packet corresponds to the normal file list, the second path of the packet is controlled via a black list engine. If the packet corresponds to an existing file list by searching for the download path and file of the packet, the packet is blocked. If the packet does not correspond to the existing file list, the packet is transferred to a static analysis engine.

The processes 314 and 316 are described in greater detail with reference to FIG. 4.

Figure 4:
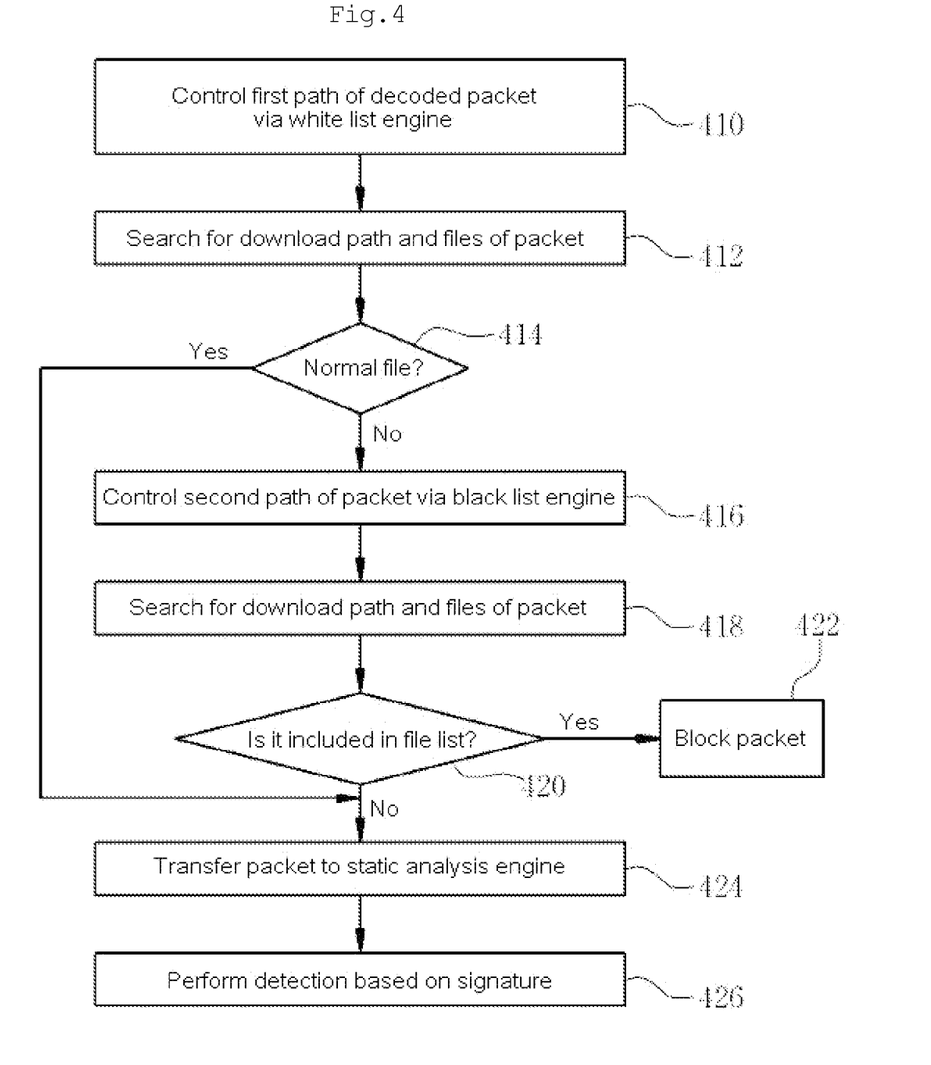
FIG. 4 is a flowchart illustrating the processing of a packet for each engine placed in a path along which the packet is forwarded in the method of providing analysis service based on behavior in a mobile network environment according to an embodiment of the present invention.

FIG. 4 is a flowchart illustrating the processing of a packet for each engine placed in a path along which the packet is forwarded in the method of providing analysis service based on behavior in a mobile network environment according to an embodiment of the present invention.

Referring to FIG. 4, in operation 410, in order to control the path of the packet based on the predetermined policy information, the first path of the decoded packet is controlled via the white list engine.

In operation 414, the white list engine determines whether the packet corresponds to a normal file based on the existing normal file list by searching for the download path and file of the packet in operation 412.

If, as a result of the determination, it is determined that the packet does not correspond to the normal file, the process proceeds to operation 416 in which the second path of the packet is controlled via a black list engine.

That is, a download path (URL) and whether a downloaded file is a previously received normal file are checked via a DB managed by the white list engine. If it is determined that the downloaded file is not present in the normal file list, it is processed by the black list engine.

Furthermore, if, as a result of the check, the download path and file of the packet are present in the normal file list of the white list engine, a timeout range is checked. If, as a result of the check, it is found that the timeout range has been exceeded, the packet is forwarded along a path to the black list engine. If, as a result of the check, it is found that the timeout range has not been exceeded, the packet is forwarded along a path to the static analysis engine.

Thereafter, in operation 418, the download path and file of the packet whose second path has been controlled via the black list engine are searched for. In operation 420, whether the packet is included in the file list is checked via the DB of the black list engine. If, as a result of the check, it is found that the packet is included in the file list, the process proceeds to operation 422 in which the packet is blocked. If, as a result of the check, it is found that the packet is not included in the file list, the process proceeds operation 424 in which the packet is transferred to the static analysis engine.

If, as a result of the check in the process 414, it is found that the packet is present in the normal file list, the packet is transferred to the static analysis engine in operation 424.

In operation 426, malware is detected in the packet whose path has been controlled via the static analysis engine based on a signature. If malware is detected in the packet, the packet is blocked.

Referring back to FIG. 3, in operation 318, downloaded files corresponding to the URL of the packet that has been analyzed by a specific engine, that is, the white list engine or the black list engine, and transferred to the static analysis engine are collected and extracted as an app file, and then the corresponding packet is processed.

This process is described in greater detail with reference to FIG. 5.

Figure 5:
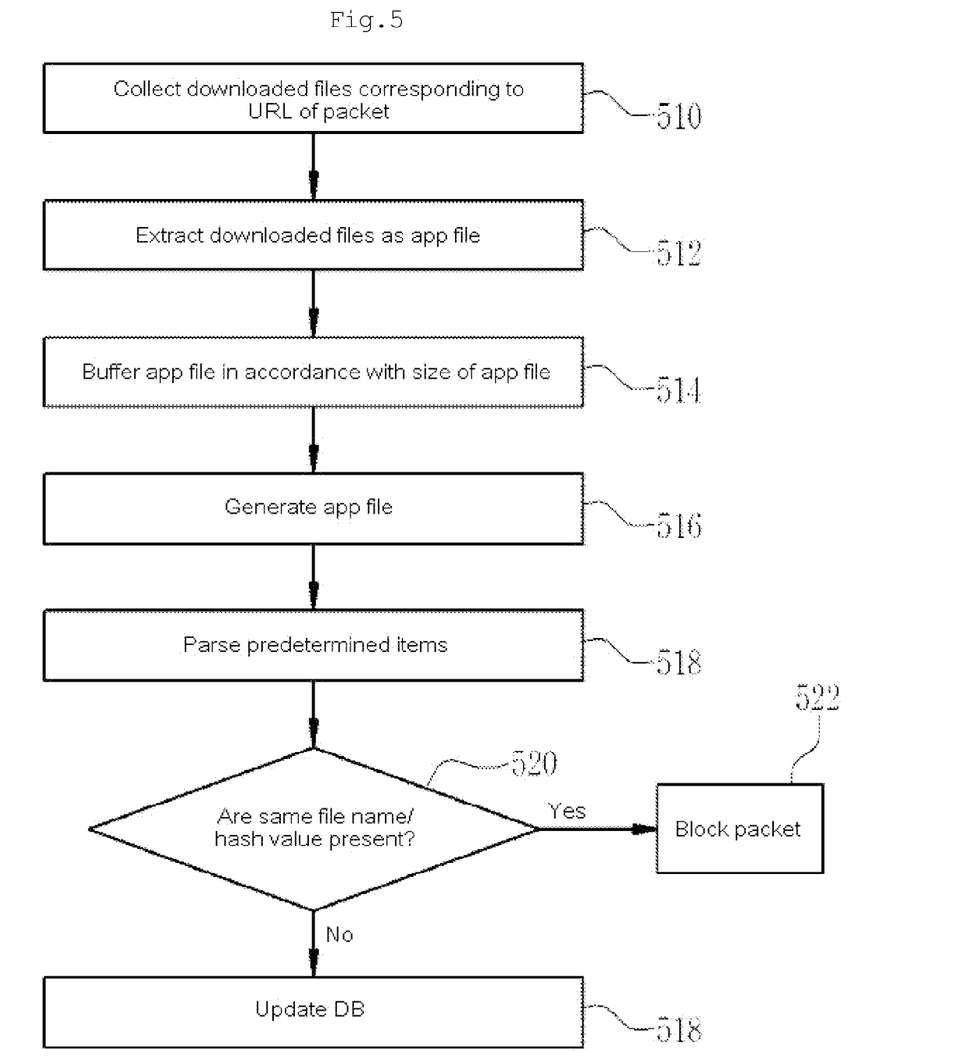
FIG. 5 is a flowchart illustrating the processing of a packet for each engine placed in a path along which the packet is forwarded in the method of providing analysis service based on behavior in a mobile network environment according to an embodiment of the present invention.

FIG. 5 is a flowchart illustrating the processing of a packet for each engine placed in a path along which the packet is forwarded in the method of providing analysis service based on behavior in a mobile network environment according to an embodiment of the present invention.

Referring to FIG. 5, in operation 510, the downloaded files corresponding to the URL of the packet are collected in order to collect the downloaded files corresponding to the URL of the packet and to extract the downloaded files as an app file. In operation 512, the packet is extracted as an app file.

In operation 514, a file extraction engine extracts an app file from the download URL based on the structure of an attached file, and buffers the extracted app file in accordance with the size of the app file extracted from the packet. In operation 516, the buffered app file is generated as an app file.

Thereafter, in operation 518, a harmful file management engine parses predetermined items of the extracted app file, and manages a URL, downloaded file, hash value, date, and harmful information maintenance time. In operation 520, the file check engine checks the integrity of the extracted app file and whether the extracted app file has the format of an app file by determining whether the same file name and hash value are present. If, as a result of the check, it is found that the same file name and hash value are present, the packet is blocked in operation 522. If, as a result of the check, it is found that the same file name and hash value are not present, the DB of the file check engine is updated in operation 524.

Referring back to FIG. 3, in operation 320, the app file of the packet processed through the aforementioned process is transferred to a virtual machine to which virtualized computing resources based on a manycore processor environment have been allocated.

In operation 322, the data and behavior of the app file are analyzed for each OS version of the virtual machine. In operation 324, whether malware is present in the app file and whether the app file has accessed the resources are determined. A corresponding app is selectively managed based on a result of the determination.

In the process of selectively managing a corresponding app, if, as a result of the determination, it is determined that the app file is a malicious file, the black list engine performs the comparison of the malicious URLs, file names, and the hash values of the app file and the malicious file. If, as a result of the comparison, it is found that the app file is not a malicious file, the URL and file list of the app file are registered with the white list engine and managed. If, as a result of the check in operation 326, it is found that the app file is a malicious file, the DB of the black list engine is updated in operation 330.

If, as a result of the check, it is found that the app file is not a malicious file, the DB of the white list engine is updated in operation 328.

The operation 322 is described in greater detail with reference to FIG. 6.

Figure 6:
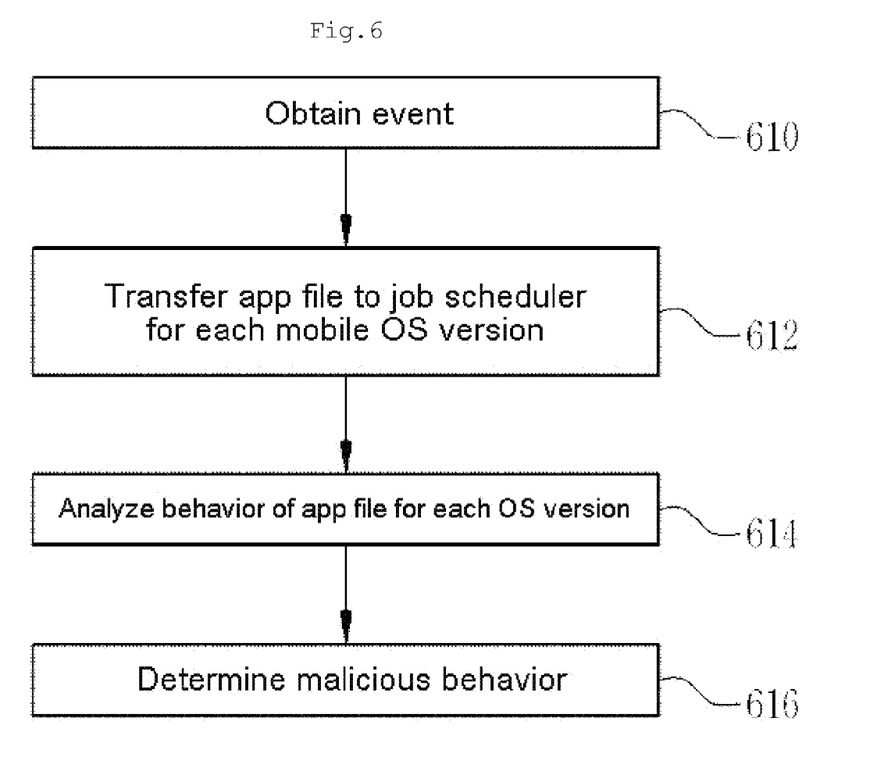
FIG. 6 is a flowchart illustrating the analysis of the data and behavior of an app file for each OS version of the virtual machine in the method of providing analysis service on behavior in a mobile network environment according to an embodiment of the present invention.

FIG. 6 is a flowchart illustrating the analysis of the data and behavior of an app file for each OS version of the virtual machine in the method of providing analysis service based on behavior in a mobile network environment according to an embodiment of the present invention.

Referring to FIG. 6, in operation 610, an event that occurs when a corresponding app accesses resource within a mobile terminal is obtained.

That is, if the app attempts to access resources within the mobile terminal and uses and controls the resources, an event that occurs in connection with the collection of information about the resources is monitored and obtained.

In operation 612, the app file is transferred to a job scheduler corresponding to each mobile OS version. Whether the behavior of the app file is malicious behavior is determined in operation 616 by analyzing the behavior of the app file for each OS version in operation 614.

Risk factors, such as a DNS, the generation of a socket, and access to a specific folder, are determined by analyzing the behavior of the app file of a virtual machine through the operations 610 to 616. The results of the analysis of the behavior of the virtual machine are collected. Then, whether the app file is a malicious file is checked based on the collected results.

If, as a result of the check, it is found that the app file is a malicious file, the comparison of the malicious URLs, file names, and the hash values of the app file and the malicious file is performed by referring to the black list. The DB of a corresponding black list engine is updated with a result of the comparison. If, as a result of the check, it is found that the app file is not a malicious file, the URL and file list are registered with the white list engine.

As described above, in the method of providing analysis service based on behavior in a mobile network environment according to an embodiment of the present invention, for the purpose of performing behavior-based detection to rapidly analyze and manage a vulnerable point in a mobile app, a virtual mobile environment using a manycore accelerator card is constructed. A harmful app is simulated in a virtual environment. Whether the behavior of the harmful app is normal is checked and managed through the drain of data and the extraction of an environment. A vulnerable point in an app is previously blocked, and whether a normal app is used is determined and managed.

The method of providing analysis service based on behavior in a mobile network environment according to the present embodiment has been described above.

An apparatus for providing analysis service based on behavior in a mobile network environment according to an embodiment of the present invention is described in detail with reference to FIG. 7.

Figure 7:
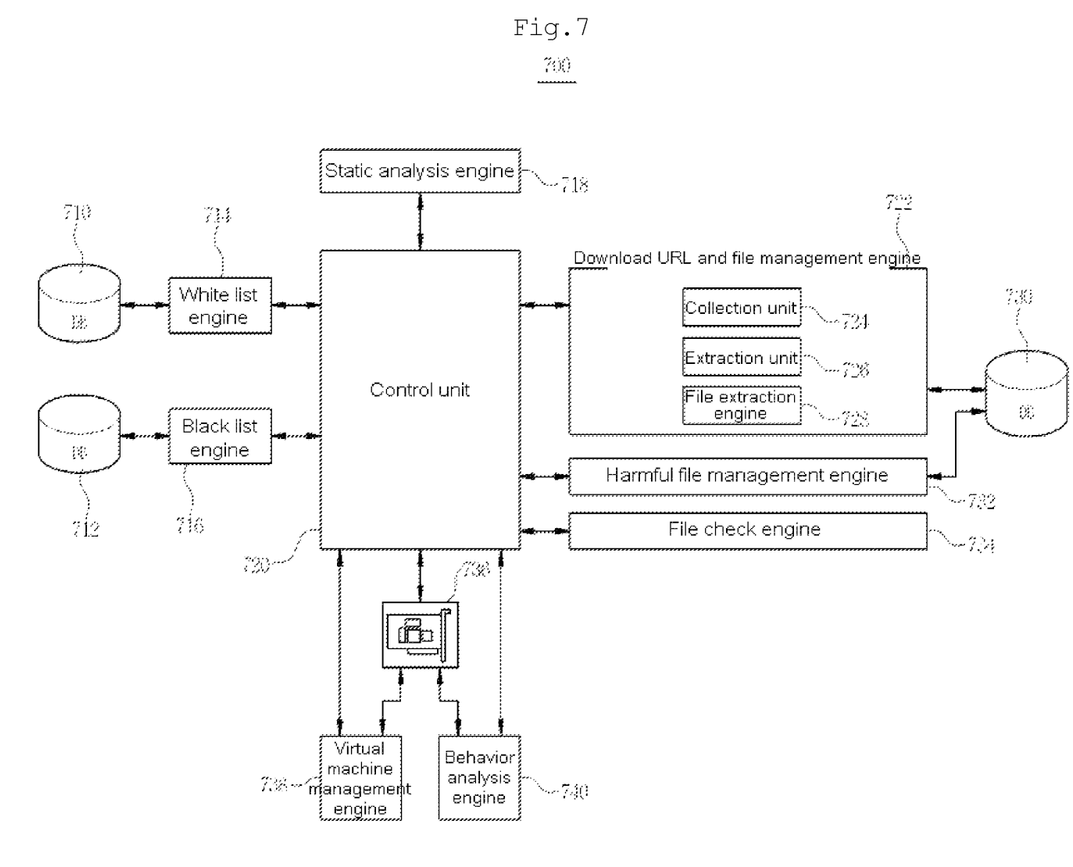
FIG. 7 is a diagram illustrating the configuration of an apparatus for providing analysis service based on behavior in a mobile network environment according to an embodiment of the present invention.

FIG. 7 is a diagram illustrating the configuration of the apparatus 700 for providing analysis service based on behavior in a mobile network environment according to the present embodiment.

Referring to FIG. 7, the apparatus 700 for providing analysis service based on behavior in a mobile network environment to which the present invention has been applied includes a white list engine 714, a black list engine 716, a static analysis engine 718, a control unit 720, a manycore card 736, a virtual machine management engine 738, a behavior analysis engine 740, a download URL and file management engine 722, a harmful file management engine 732, and a file check engine 734.

In order to detect malware in a packet loaded from an NIC and then decoded, the control unit 720 controls the path of the packet based on predetermined policy information, blocks the packet based on a result of the analysis of the packet for each engine placed in the path or extracts information about the packet, and selectively processes the extracted information for each engine in the path based on the predetermined policy information.

The white list engine 714 determines whether the packet corresponds to a normal file based on an existing normal file list by searching for the download path and files of the decoded packet whose first path has been controlled through the control unit 720. If, as a result of the determination, it is determined that the packet corresponds to a normal file, the white list engine 714 transfers the packet to the black list engine 716 by which the second path of the packet is controlled under the control of the control unit 720. If, as a result of the determination, it is determined that the packet does not correspond to a normal file, the white list engine 714 transfers the packet to the static analysis engine 718.

Furthermore, if the download path and files of the packet are present in the normal file list, the white list engine 714 checks whether a timeout range has been exceeded. If, as a result of the check, it is found that the timeout range has been exceeded, the packet is forwarded along a path to the black list engine 716. If, as a result of the check, it is found that the timeout range has not been exceeded, the packet is forwarded to a path to the static analysis engine 718.

The black list engine 716 searches for the download path and file of the packet received from the white list engine 714. If, as a result of the search, it is found that the packet corresponds to an existing file list, the black list engine 716 blocks the packet.

The static analysis engine 718 detects malware in the packet based on the signature of the packet whose paths have been controlled by the white list engine and the black list engine. If malware is detected in the packet, the static analysis engine 718 blocks the packet.

The download path and file management engine 722 collects downloaded files corresponding to the URL of the packet through the control unit 720, extracts the downloaded files as an app file, and transfers the extracted app file to a virtual machine to which virtualized computing resources have been allocated based on a manycore processor environment.

More specifically, the download path and file management engine 722 includes a collection unit 724 configured to collect the downloaded files corresponding to the URL of the packet, an extraction unit 726 configured to collect the downloaded files corresponding to the URL in the packet collected by the collection unit 724 and to extract the downloaded files as the app file, and a file extraction engine 728 configured to extract the app file from the download URL based on the structure of an attached file, to buffer the extracted app file in accordance with the size of the app file extracted from the packet, and to generate the buffered app file as an app file.

The virtual machine management engine 738 determines whether malware is present in the app file and whether the app file has accessed the resources by analyzing the data and behavior of the app file for each OS version of the virtual machine under the control of the control unit 720. The virtual machine management engine 738 selectively manages a corresponding app based on a result of the determination.

Furthermore, the virtual machine management engine 738 obtains an event that occurs when a corresponding app accesses resources within a mobile terminal, analyzes the behavior of the app file for each OS version with respect to the app file transferred to a job scheduler for each mobile OS version by checking the obtained event, and determines whether a malicious behavior is present through behavior analysis.

Meanwhile, the virtual machine management engine 738 distributes jobs, and manages and uses virtual machines in order to efficiently use virtual OSs because the manycore card (or chip) includes 200 CPUs each having a small capacity.

If the job of each OS has a low processing speed as in a cloud environment, the virtual machine of a corresponding OS is managed in such a way as to activate the virtual machine and control the processing speed.

The behavior analysis engine 740 combines malicious app files downloaded from a network in packet form, and extracts an app file from the combined malicious app files. When a corresponding app file is executed in a virtual mobile environment, the behavior analysis engine 740 accesses a specific file/directory of a mobile app or checks whether an accessed file is transmitted through communication.

The behavior analysis engine 740 checks whether a specific register or file is altered. After an analysis has been terminated in a virtual mobile OS environment, the behavior analysis engine 740 recovers the virtual mobile OS environment to an initial OS environment, and performs a subsequent analysis.

The harmful file management engine 732 parses predetermined items of the extracted app file, and manages a URL, downloaded file, hash value, date, and harmful information maintenance time.

The file check engine 734 checks the integrity of the extracted app file and whether the extracted app file has the format of an app file by determining whether the same file name and hash value are present in the extracted app file, and blocks a corresponding packet if the same file name and hash value are present in the extracted app file.

As described above, the present invention is advantageous in that an internal integrity environment for internal users within a system can be managed by analyzing and blocking a vulnerable app in real time in a mobile network environment, a harmful app can be rapidly analyzed and blocked in real time by managing systems, managed and analyzed by a plurality of respective servers, as a single system, and a plurality of vulnerable files can be simultaneously analyzed by utilizing a manycore card.

The operations regarding the method and apparatus for providing analysis service based on behavior in a mobile network environment according to the embodiments of the present invention may be performed as described above. Meanwhile, although the specific embodiments of the present invention have been disclosed for illustrative purposes, various modifications and variations can be made without departing from the scope and spirit of the invention. Accordingly, the scope of the present invention should be determined based on the claims and equivalents to the claims, rather than the above-described embodiments.

What is claimed is:

1. A method of providing analysis service based on behavior in a mobile network environment, the method comprising:
controlling a path of a packet based on predetermined policy information in order to detect malware in the packet loaded from a network interface card (NIC) and then decoded;
blocking the packet based on a result of an analysis of the packet for each engine placed in the path, or extracting information about the packet and selectively processing the extracted information for each engine placed in the path based on the predetermined policy information;
collecting, by a specific engine, downloaded files corresponding to a uniform resource locator (URL) of the packet, extracting the downloaded files as an app file, and transferring the extracted app file to a virtual machine to which virtualized computing resources based on a manycore processor environment have been allocated; and
determining whether malware is present in the app file and whether the app file has accessed the resources by analyzing data and behavior of the app file for each operation system (OS) version of the virtual machine, and selectively managing the corresponding app based on a result of the determination,
wherein controlling the path of the packet based on the predetermined policy information comprises:
controlling, by a white list engine, a first path of the decoded packet, and determining whether the decoded packet corresponds to a normal file based on an existing normal file list by searching for a download path and files of the decoded packet;
controlling, by a black list engine, a second path of the packet if, as a result of the determination, it is found that the decoded packet corresponds to the normal file list, searching for a download path and files of the packet, blocking the packet if, as a result of the search, it is found that the packet corresponds to an existing file list, and transferring the packet to a static analysis engine if, as a result of the search, it is found that the packet does not correspond to the existing file list,
the method further comprising:
checking whether a timeout range has been exceeded if, as a result of the determination, it is determined that the download path and files of the packet are present in the normal file list of the white list engine;
forwarding the packet along a path to the black list engine, of if, as a result of the check, it is found that the timeout range has been exceeded; and
forwarding the packet along a path to the static analysis engine if, as a result of the check, it is found that the timeout range has not been exceeded,
wherein collecting the downloaded files corresponding to the URL of the packet and extracting the downloaded files as the app file comprises extracting, by a file extraction engine, the app file based on a structure of an attached file from the download URL, buffering the extracted app file in accordance with a size of the app file extracted from the packet, and generating the buffered app file as an app file, and
wherein analyzing the data and behavior of the app file for each OS version of the virtual machine comprises:
obtaining an event that occurs when the corresponding app accesses resources within a mobile terminal;
analyzing the behavior of the app file for each OS version with respect to the app file transferred to a job scheduler for each mobile OS version by checking the obtained event; and
determining whether malicious behavior is present by analyzing the behavior of the app file.

2. The method of claim 1, further comprising:
detecting malware in the packet, whose path has been controlled by the static analysis engine, based on a signature; and
blocking the packet if, as a result of the detection, it is found that the malware has been detected.

3. The method of claim 1, wherein a harmful file management engine parses predetermined items of the extracted app file, and manages a URL, a downloaded file, a hash value, a date, and a harmful information maintenance time.

4. The method of claim 1, further comprising:
checking, by a file check engine, an integrity of the extracted app file and whether the app file has a format of an app file by checking whether an identical file name and hash value are present; and
blocking the packet if, as a result of the check, it is found that the identical file name and hash value are present.

5. The method of claim 1, wherein selectively managing the app comprises:
performing, by a black list engine, comparison of malicious URLs, file names, and hash values if, as a result of the determination, it is determined that the app file is a malicious file; and
registering the URL and file list of the app file with the white list engine if, as a result of the determination, it is determined that the app file is not a malicious file, and managing the URL and file list of the app file.

* * * * *